(12) United States Patent
Hedlund et al.

(10) Patent No.: US 12,691,893 B2
(45) Date of Patent: Jul. 28, 2026

(54) VEHICLE PASSING ASSISTANCE SYSTEM

(71) Applicant: FCA US LLC, Auburn Hills, MI (US)

(72) Inventors: Jason C Hedlund, Auburn Hills, MI (US); Randy T Gerken, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 24 days.

(21) Appl. No.: 18/754,306

(22) Filed: Jun. 26, 2024

(65) Prior Publication Data

US 2026/0001568 A1 Jan. 1, 2026

(51) Int. Cl.
B60W 50/14 (2020.01)
B60W 40/04 (2006.01)

(52) U.S. Cl.
CPC ............ B60W 50/14 (2013.01); B60W 40/04 (2013.01); *B60W 2050/146* (2013.01); *B60W 2420/403* (2013.01); *B60W 2554/80* (2020.02); *B60W 2556/65* (2020.02)

(58) Field of Classification Search
CPC .. B60W 50/14; B60W 40/04; B60W 2556/65; B60W 2554/80; B60W 2050/146; B60W 2420/403
See application file for complete search history.

(56) References Cited

U.S. PATENT DOCUMENTS

| | | | |
|---|---|---|---|
| 9,483,947 B2 | 11/2016 | Strassberger | |
| 9,682,712 B2 | 6/2017 | Kubo | |
| 11,545,035 B2 | 1/2023 | Nagata | |
| 2015/0061894 A1* | 3/2015 | Strassberger .......... | G08G 1/161 340/901 |
| 2018/0148061 A1* | 5/2018 | Reckziegel ........... | B60W 50/14 |
| 2021/0150904 A1* | 5/2021 | Nagata ............. | G08G 1/096791 |

* cited by examiner

*Primary Examiner* — Andrew J Cromer
(74) *Attorney, Agent, or Firm* — Jeremy J. Klobucar

(57) ABSTRACT

A vehicle passing assistance system to assist a passing maneuver through an oncoming traffic lane includes a wireless communications system configured to connect with surrounding vehicles, a user interface configured to provide information about the passing maneuver, and sensors configured to measure operating parameters of the vehicle during the passing maneuver. A controller is in signal communication with the wireless communications system, the user interface, and the one or more sensors. During the passing maneuver, the controller is programmed to detect the vehicle is traveling on a non-divided roadway where the passing maneuver will occur through the oncoming traffic lane, detect initiation of the passing maneuver, scan for and connect to surrounding vehicles via the wireless communications system, receive data from the connected vehicles, and display information to a driver of the vehicle, based on the received data and measured operating parameters, regarding the initiated passing maneuver.

18 Claims, 4 Drawing Sheets

VEHICLE PASSING ASSISTANCE SYSTEM

FIELD

The present application relates generally to vehicle systems and, more particularly, to a vehicle passing assistance system.

BACKGROUND

While driving, a driver may desire to pass a slower vehicle. In some passing situations, this requires the driver to enter a lane with oncoming traffic. However, it may be difficult for the driver to judge the speed and distance of the oncoming traffic in order to execute a safe passing maneuver. Moreover, the slower vehicle may obstruct the driver's view of the oncoming traffic lane, particularly when the slower vehicle is a large vehicle like a tractor trailer. The slower vehicle may also obstruct the view of additional vehicles in front of the slower vehicle, which could further affect execution of a safe passing maneuver. Accordingly, while traditional methods of passing work well for their intended purpose, there remains a desire for improvement in the relevant art.

SUMMARY

In one example aspect of the invention, a vehicle passing assistance system to assist a vehicle in executing a passing maneuver through an oncoming traffic lane is provided. In one example implementation, the system includes a wireless communications system configured to connect with one or more surrounding vehicles, a user interface configured to provide information about the passing maneuver, and one or more sensors configured to measure operating parameters of the vehicle during the passing maneuver. A controller is in signal communication with the wireless communications system, the user interface, and the one or more sensors. During the passing maneuver, the controller is programmed to detect the vehicle is traveling on a non-divided roadway where the passing maneuver will occur through the oncoming traffic lane, detect initiation of the passing maneuver, scan for and connect to surrounding vehicles via the wireless communications system, receive data from the connected vehicles, and display information to a driver of the vehicle, based on the received data and measured operating parameters, regarding the initiated passing maneuver.

In addition to the foregoing, the described system may include one or more of the following features: wherein the controller detects the initiation of the passing maneuver by detecting, via the one or more sensors, the vehicle has crossed over a center line into the oncoming traffic lane; wherein the controller detects the initiation of the passing maneuver by receiving a driver initiated pass request via the user interface; wherein the connected vehicles include a preceding vehicle to be passed during the passing maneuver; and wherein the controller is further programmed to display, on the user interface, a front camera view of the preceding vehicle, based on the received data from the connected vehicles.

In addition to the foregoing, the described system may include one or more of the following features: wherein the controller is further programmed to determine, based on the received data, if enough space is available in front of the preceding vehicle for the vehicle to execute the passing maneuver; wherein the controller is further programmed to connect to an edge computing center via the wireless communications system, wherein the edge computing center receives and processes data from the connected surrounding vehicles; and wherein the connected vehicles include an oncoming vehicle traveling in the oncoming traffic lane.

In addition to the foregoing, the described system may include one or more of the following features: wherein the controller is further programmed to determine if there is enough time and distance for the vehicle to execute the passing maneuver based on a speed of the oncoming vehicle, a speed of the passing vehicle, and a distance therebetween; wherein the controller is further programmed to send a notification to the connected surrounding vehicles indicating the passing maneuver is in progress; wherein the controller is further programmed to determine if the vehicle is currently in a passing zone or a no passing zone of the non-divided roadway; wherein the displayed information is a remaining time and a remaining distance for the vehicle to complete the passing maneuver based on the received data from the connected vehicles; and wherein the one or more sensors include one or more cameras, one or more ultrasonic sensors, and at least one of a RADAR or LIDAR.

In accordance with another example aspect of the invention, a method of operating a vehicle passing assistance system to assist a vehicle in executing a passing maneuver through an oncoming traffic lane is provided. In one example implementation, the method includes detecting, by a controller and one or more sensors, the vehicle is traveling on a non-divided roadway where the passing maneuver will occur through the oncoming traffic lane; detecting, by the controller, initiation of the passing maneuver; scanning for and connecting to surrounding vehicles via the controller and a wireless communication system; receiving, at the controller, data from the connected vehicles; and displaying, by the controller and on a user interface, information to a driver of the vehicle regarding the initiated passing maneuver, based on the received data and measured operating parameters from the one or more sensors.

In addition to the foregoing, the described method may include one or more of the following: wherein detecting initiation of the passing maneuver includes detecting, by the controller and the one or more sensors, the vehicle has crossed over a center line into the oncoming traffic lane, and detecting, by the controller, a driver initiated pass request via the user interface; and wherein the connected vehicles include (i) a preceding vehicle to be passed during the passing maneuver, and (ii) an oncoming vehicle traveling in the oncoming traffic lane.

In addition to the foregoing, the described method may include one or more of the following: displaying, by the controller and on the user interface, a front camera view of the preceding vehicle, determining, by the controller and the received data, if enough space is available in front of the preceding vehicle for the vehicle to execute the passing maneuver, and determining, by the controller and the received data, if there is enough time and distance for the vehicle to execute the passing maneuver based on a speed and location of the oncoming vehicle; sending, by the controller and the wireless communications system, a notification to the connected surrounding vehicles indicating the passing maneuver is in progress; determining, by the controller and a navigation system, if the vehicle is currently in a passing zone or a no passing zone of the non-divided roadway; and wherein said displaying information includes displaying a remaining time and a remaining distance for the vehicle to complete the passing maneuver based on the received data from the connected vehicles.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

Figure 1:
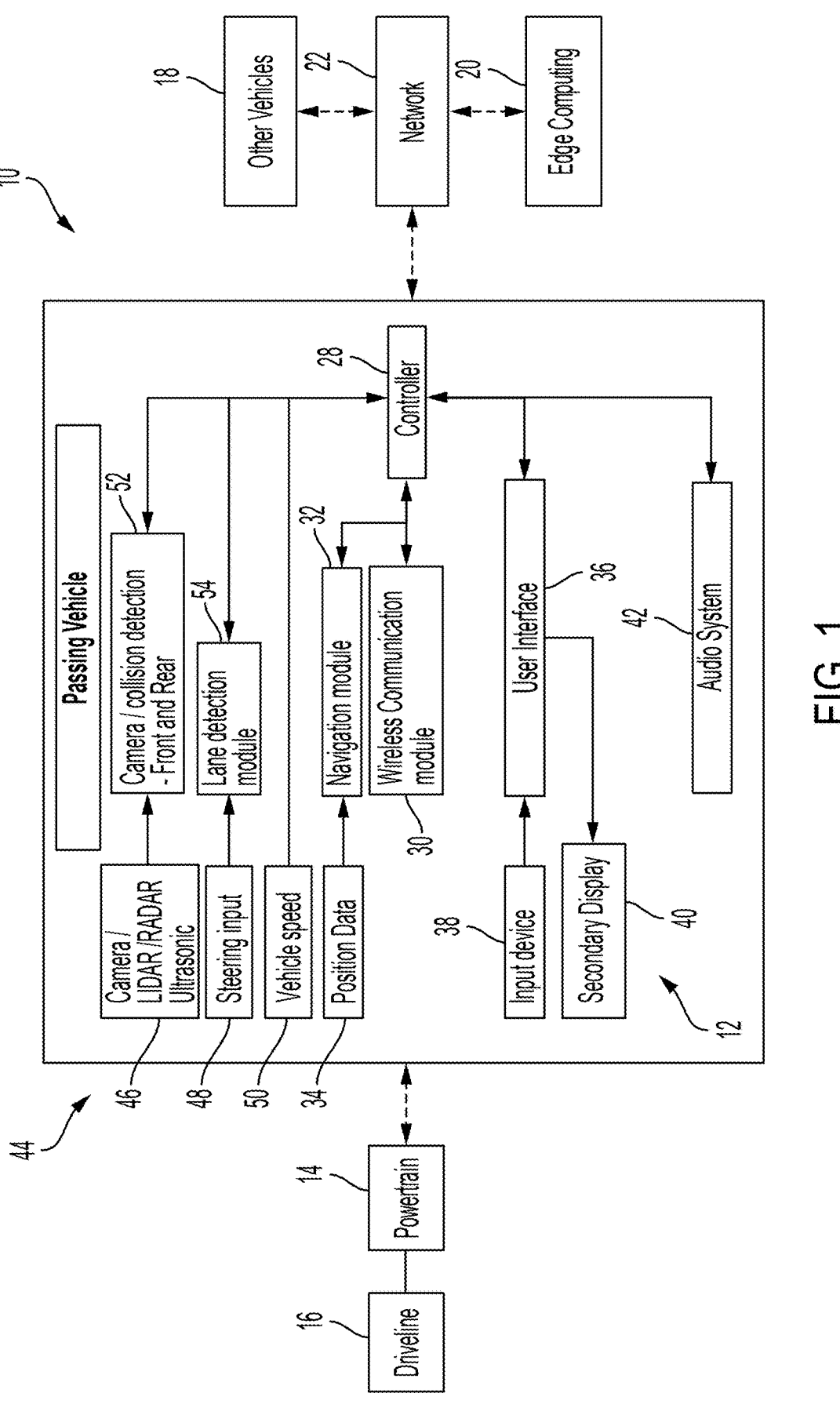
FIG. 1 is a schematic diagram of a vehicle with an example vehicle passing assistance system in accordance with the principles of the present disclosure.

As previously discussed, some conventional passing maneuvers require a driver to enter a lane of oncoming traffic. However, the driver must often rely on their own vision and judgment to determine if the passing maneuver can be safely executed. Moreover, surrounding vehicles may obstruct the view of the passing driver. Accordingly, described herein are systems and methods to assist a driver in executing a safe passing maneuver. In one example operation, the system is generally configured to connect to surrounding vehicles, provide camera views from other vehicles, determine distances to each vehicle, and subsequently determine if a safe passing maneuver can be executed in an oncoming traffic lane.

In one example, the system includes a passing feature to assist a driver to understand if a road is clear to pass a vehicle in front of it with oncoming traffic. The system utilizes an internal and external sensor set and combines onboard road mapping data, radar, visual cameras, ultrasonic sensors, and/or external RF signals such as V2X, GPS, mapping data, and mobile device data to identify surrounding vehicles, distances to each vehicle, and road features. Data processing may be performed on and/or off board the vehicle. This passing feature may be activated by the driver when they intend to pass a vehicle in front of them on a non-divided roadway.

The system is configured to alert the driver if, during the passing request, the current traveling lane is of a non-passing type or area, or the passing vehicle cannot complete the passing maneuver before a non-passing area is arrived at. In one example, the system is configured to determine how far away and how much time to wait before it will be legal to pass and display that information to the driver. Once the system determines the road type is satisfactory to pass on and the current lane is of a valid lane passing area, the system connects to surrounding vehicles via a network (e.g., mobile device network, internet, V2X, etc.) and attempts to determine their distance, direction, and speed through an offboard computer (e.g., mobile edge computing) or onboard controller configured to establish connections to each surrounding vehicle.

The system then attempts to establish a connection with a forward-facing camera of the vehicle it intends to pass and displays the camera view on an in-vehicle display. The system may also additionally or alternatively establish a connection with a forward-facing camera of an oncoming vehicle. The system then shows the number of vehicles it was able to connect to and available camera views. The system then determines the conditions are safe for a passing maneuver based on distances, direction, and speed of each vehicle in a predefined current zone and indicates the results to the driver via visual, audio, and/or haptic notifications. The driver may then execute the passing maneuver when ready.

The system may then alter/adjust operations once the passing maneuver is commenced and the passing vehicle crosses over the center line of the road. For example, the system may shut off the connected camera(s) and subsequently display the relative distances to each vehicle from the passing vehicle. The system is also configured to send notifications to the surrounding connected vehicles indicating the passing maneuver is being performed. For example, the vehicle being passed may receive a notification and subsequently display that the vehicle is being passed. Similarly, oncoming vehicles may receive a notification and subsequently display that a vehicle pass is in progress in front of their vehicle.

In the event a non-connected vehicle is determined to be in the path of the passing vehicle, the system determines the distance to the non-connected vehicle and provides a notification to the driver to either abort the maneuver or display the distance to the non-connected vehicle and begin tracking thereof. Once the vehicle in front is passed, the system notifies the driver to begin merging back into the original travel lane. Once the system determines the vehicle is back in the original travel lane, the system disconnects from the surrounding vehicles and returns to a ready state to be activated again. If the driver aborts the passing maneuver and returns to the original travel lane, the system continues to show updates to the surrounding vehicle positions and disconnects from all vehicles after a predetermined amount of time, before returning to the ready state to be activated again.

If the driver attempts to pull out into a determined passing state regardless of road passing state, the system automatically enables the passing feature and begins showing distances and connecting to the surrounding vehicles. The feature will operate in the same manner as previously described, except that it will issue a warning for detection of a non-passing lane if identified. In one example, the system will not enable warning to other vehicles until additional forward motion towards the vehicle being passed has occurred to thereby prevent false warnings due to a drive pulling into the oncoming lane for visibility or to avoid an obstacle (e.g., pothole). In such a condition, the system does not return to the waiting state and remains in the ready state to be activated. If the vehicle attempting to pass never returns to the original travel lane, the passing feature may time out and return to the ready state or a failure state.

Referring now to FIG. 1, a functional block diagram of a vehicle 10 having an example vehicle passing assistance system 12 according to the principles of the present application is illustrated. The vehicle 10 generally includes a powertrain 14 (e.g., an internal combustion engine, one or more electric motors, or some combination thereof) configured to generate and transfer drive torque to a driveline 16 for vehicle propulsion. As described herein in more detail, the vehicle passing assistance system 12 is configured to communicate and interact with one or more surrounding vehicles 18 and an edge computing center 20 via a wireless communications network 22 when attempting to execute a passing maneuver through an oncoming traffic lane. The network 22 can be any suitable communication network including, for example, a satellite network, a cellular network (3G, 4G LTE, 5G, etc.), a computing network (the internet, etc.), or some combination thereof.

In the example embodiment, the vehicle 10 includes a control system or controller 28 configured to control operation of the vehicle 10. This primarily includes controlling the powertrain 14 to generate a desired amount of drive torque to satisfy a driver torque request. The controller 28 also performs at least a portion of the vehicle passing and connectivity techniques of the present application. The vehicle passing assistance system 12 thus includes or interacts with the control system 28, a wireless communications system or module 30, the surrounding vehicles 18, and the edge computing center 20. Alternatively, it will be appreciated that the techniques described herein may also take place on one or more cloud-based servers.

In one implementation, the communication module 30 is configured for communication with the edge computing center 20 via the wireless communications network 22 and/or vehicle-to-vehicle (V2V) or vehicle-to-anything (V2X) communication. A user (e.g., an owner or authorized operator of the vehicle 10) may also be able to provide user inputs via an authorized computing device (not shown) such as, for example, a mobile phone, as part of the techniques of the present application. The vehicle also includes a navigation module or system 32 in signal communication with the controller 28 and configured to receive position data 34, for example, from a global positioning satellite (GPS) system (not shown).

In the example embodiment, the vehicle 10 also includes a user interface 36, which includes a plurality of devices 38 each capable of receiving user input and/or providing output to a user of the vehicle 10. Non-limiting examples of the components of the user interface 36 include an instrument panel cluster (IPC), a touch display (e.g., as part of an infotainment unit), user-actuatable input devices (buttons, knobs, etc.), a heads up display (HUD), a human machine interface (HMI), and physical, gesture input, computer request, or voice recognition input. The user interface 36 is also configured to provide output, such as HMI and camera feed output to a secondary display 40, as well as notifications or alerts to a vehicle audio system 42.

The vehicle 10 also includes one or more sensors 44 configured to measure operating parameters of the vehicle 10. Example sensors include camera, LIDAR, RADAR, and/or ultrasonic sensors 46, a steering input sensor 48, and vehicle speed sensors 50. The sensors 46 are in signal communication with a camera/collision detection system 52 (e.g., advanced driver assistance system), steering input sensor 48 is in signal communication with a lane detection module 54 configured to determine lane position of vehicle 10, and vehicle speed sensors 50 are in signal communication with controller 28.

Figure 2:
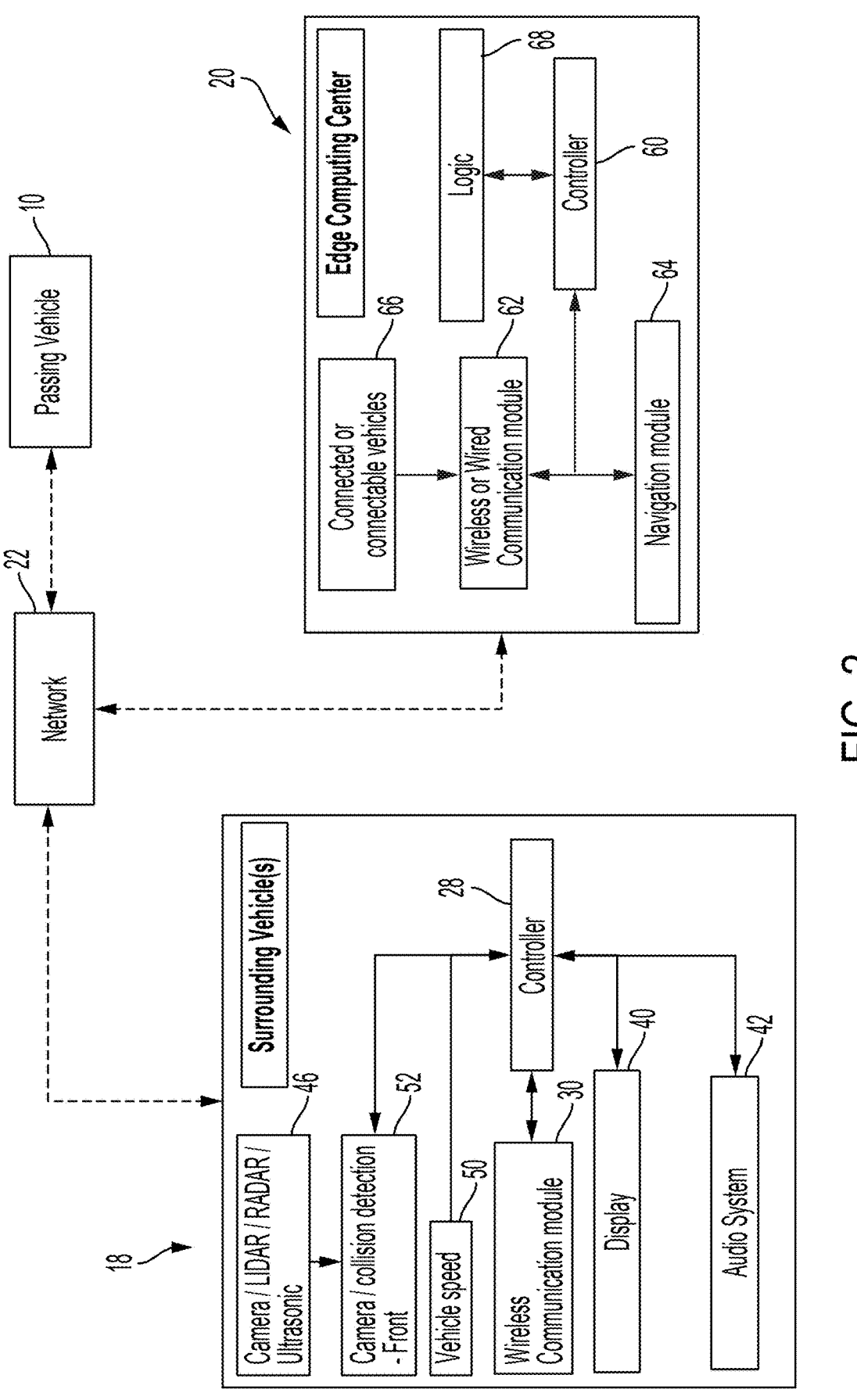
FIG. 2 is a schematic diagram of an example surrounding vehicle and edge computing center configured to communicate with the vehicle passing assistance system of FIG. 1, in accordance with the principles of the present disclosure.

Referring now to FIG. 2, the surrounding vehicle(s) 18 and edge computing center 20 are described in more detail. The surrounding vehicle(s) 18 include features similar to vehicle 10 and are identified by the same reference numerals. The edge computing center 20 is a platform that generally includes on-site or near-site computing devices or physical hardware that collect and transmit data such as, for example, processors, servers, wireless transmitters, sensors, controllers, cameras, etc.

In the example embodiment, the edge computing center 20 generally includes a controller 60 in signal communication with a wired or wireless communication module 62 and a navigation module 64. The communication module 62 is in signal communication with connected vehicles 66 (e.g., vehicles 10, 18) providing data such as, for example, speed, position, and lane type. The navigation module 64 is configured to provide vehicle data information such as, for example, road types, lane markers, road curve, position, and elevation of the connected vehicle. The controller 60 includes logic 68 configured to determine passing maneuver conditions such as, for example, a safe to pass condition and a time to complete the pass, as well as determine vehicle capabilities such as sensor types, transfer rates, and warnings.

Figure 3A:
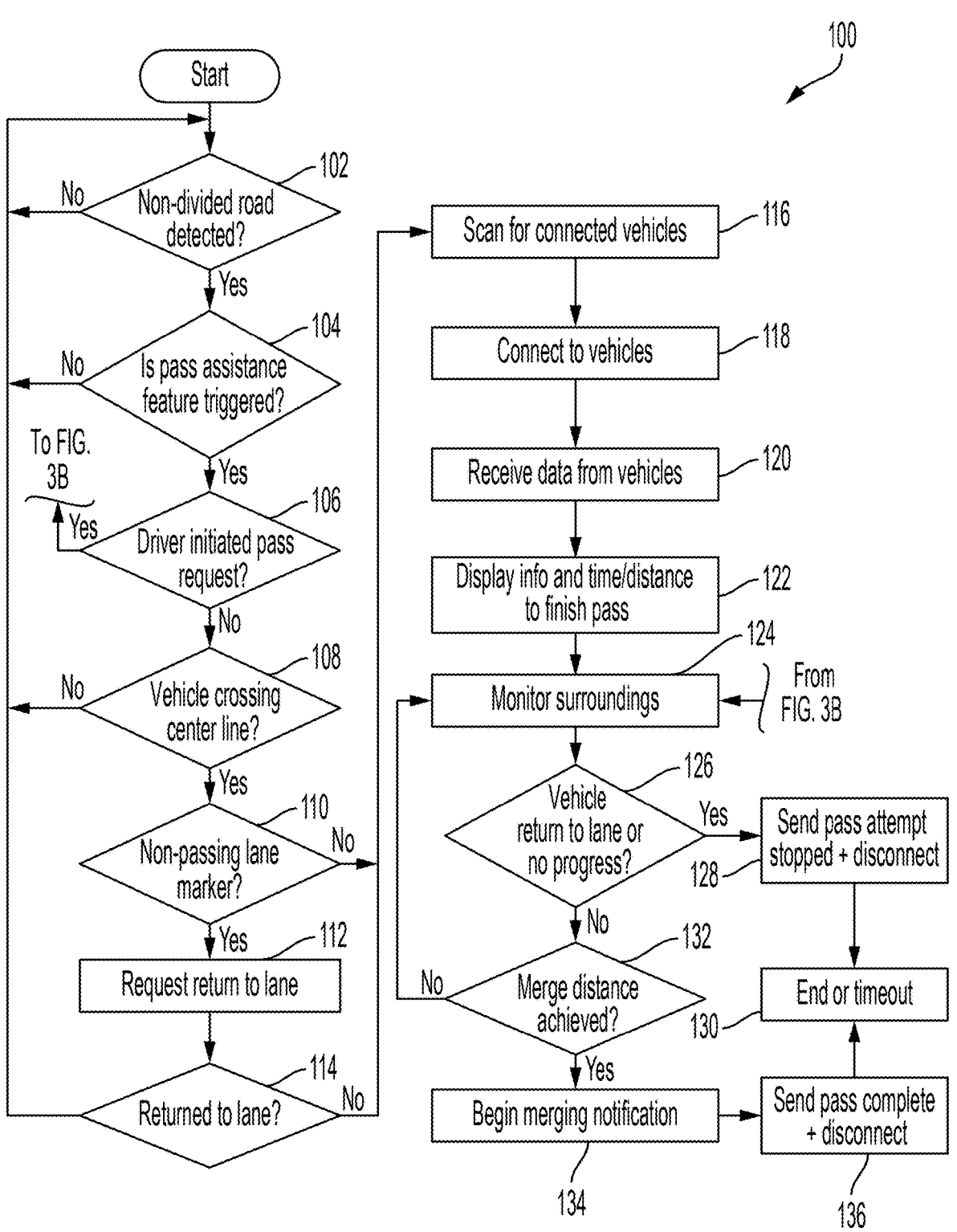
FIGS. 3A and 3B illustrate a flow diagram of an example method of operating the vehicle passing assistance system shown in FIG. 1, in accordance with the principles of the present disclosure.
Figure 3B:
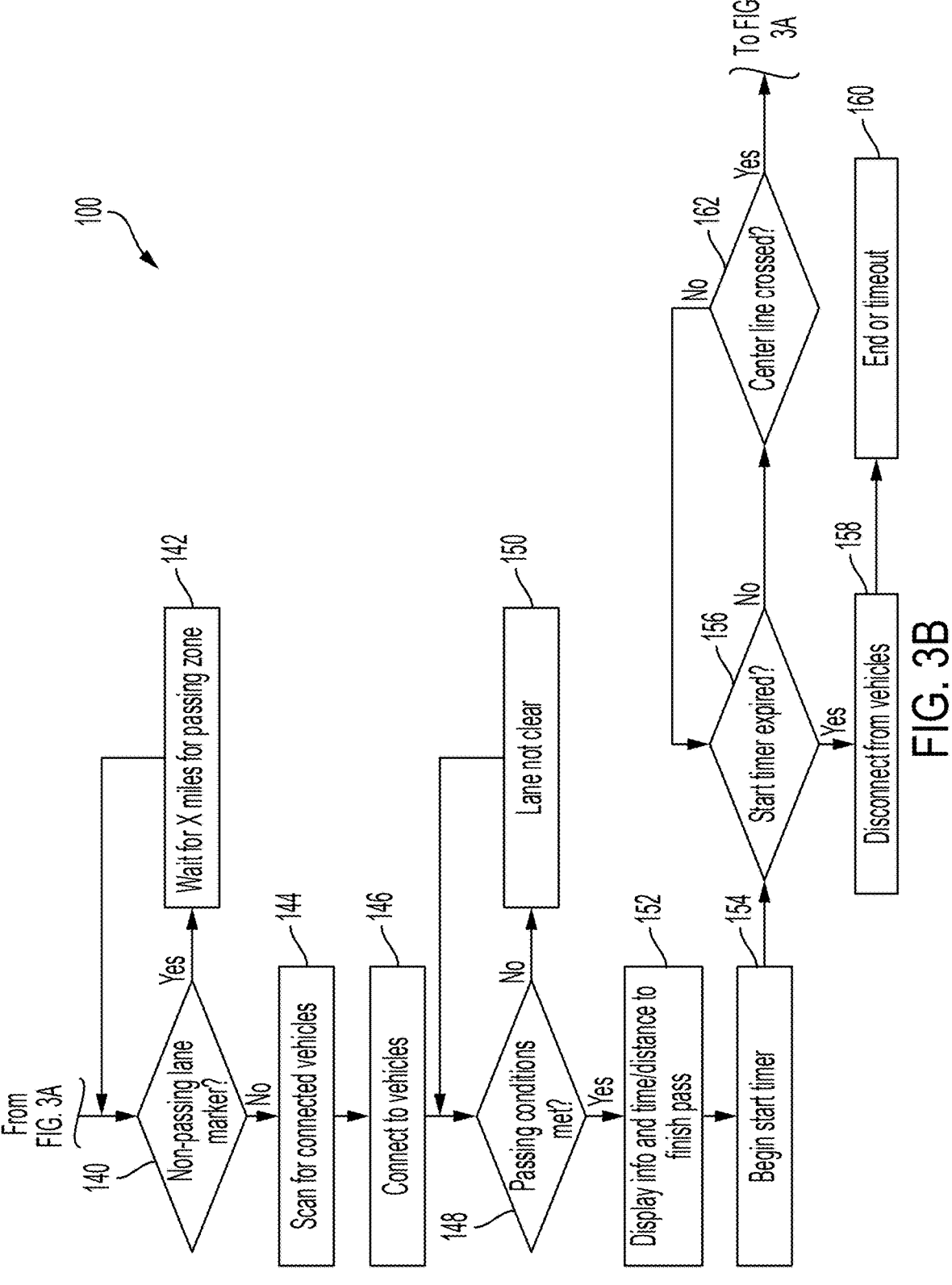

With additional reference to FIGS. 3A and 3B, an example method 100 of operating the vehicle passing assistance system 12 is provided. The method 100 begins at step 102 (FIG. 3A) and controller 28 ("control") determines if a non-divided road is detected, for example, via camera, LIDAR, RADAR, and/or ultrasonic sensors 46. If no, control returns to step 102. If yes, at step 104, control determines if a passing assistance is triggered by the vehicle 10 or operator. If no, control returns to step 102. If yes, control proceeds to determine if the type of trigger was based on a driver request or vehicle movement. However, it will be appreciated that the trigger may be any suitable type of trigger that enables system 12 to function as described herein.

At step 106, control determines if the passing assistance was triggered by a driver initiated pass request, for example, via HMI on user interface 36. If yes, control proceeds to step 140 (FIG. 3B). If no, control proceeds to step 108 and determines if the vehicle 10 is crossing the median or center line that divides the travel lane of vehicle 10 and the oncoming traffic lane. This may be determined, for example, via camera, LIDAR, RADAR, and/or ultrasonic sensors 46. If the vehicle 10 is not crossing the center line, control returns to step 102. If the vehicle 10 is crossing the center line, control proceeds to step 110.

At step 110, control determines if the road center line is a non-passing lane marker indicating the vehicle 10 is in a no passing zone. This may be determined, for example, via camera, LIDAR, RADAR, and/or ultrasonic sensors 46. If no, control proceeds to step 116. If yes, at step 112, control issues a notification to the driver to return to the original lane of travel. This notification may be presented via the HMI on user interface 36. At step 114, control determines if the vehicle has returned to the original lane of travel, for example, via sensors 46, 48. If yes, control returns to step 102. If no, control proceeds to step 116.

At step 116, control determines a passing area/zone for vehicle 10 and scans for connected vehicles (e.g., 18) within the zone. In one example, the edge computing center 20 receives the vehicle coordinates and scans that road section in its database for passing zone information (e.g., road typed, curves, stretches of road where passing is or is not allowed).

At step 118, control attempts to connect to the vehicles within the zone. For example, the edge computing center 20 identifies other vehicles in the zone (e.g., via cell phones, cell towers, etc.) and sends a request to connect and receive live information or make approximations of each vehicle location, speed, and direction. At step 120, controller 28 receives data from the connected vehicles. Example data includes camera views, speed, lane type, lane markers, proximity to other vehicles/objects, etc., which may be provided on user interface 36 and/or secondary display 40.

At step 122, the data is computed, for example at the edge computing center 20, and available passing information and time/distance left to complete the passing maneuver are displayed to the driver (e.g., via HMI on user interface 36). At step 124, control monitors the surroundings of vehicle 10 during the passing maneuver and provides updated information, notifications, etc. to vehicle 10 and connected vehicles 18. For example, controller 28 monitors a distance to re-merge into the original travel lane ahead of the vehicle being passed, collision distance for oncoming traffic, and fault monitoring of communication. Controller 28 is also configured to notify surrounding connected vehicles 18 (e.g., vehicle to be passed and oncoming vehicles) of the ongoing passing maneuver by vehicle 10.

At step 126, control determines if vehicle 10 unexpectedly returns to the original travel lane or is not making any progress in passing the front vehicle. The passing operation and connection to other vehicles may time out and end if passing progress is not made in a predetermined time period. If yes, at step 128, control sends a notification to the surrounding connected vehicles 18 indicating that the passing attempt is stopped, and subsequently disconnects from the connected vehicles 18. Control then ends or times out at step 130. If no, control proceeds to step 132.

At step 132, control determines if a predetermined merge distance is achieved where the vehicle 10 can safely merge back into the original lane of travel ahead of the vehicle that was just passed. If no, control returns to step 124. If yes, control proceeds to step 134 and provides a notification to the driver to begin merging back into the original lane of travel. For example, this notification may be provided via user interface 36, secondary display 40, and/or vehicle audio system 42. At step 136, once the merging of vehicle 10 is complete, control sends a notification to the surrounding connected vehicles 18 indicating that the passing maneuver is completed, and subsequently disconnects from the connected vehicles 18. Control then ends or times out at step 130.

With reference now to FIG. 3B, control proceeds to step 140 when, at step 106, control determines the passing assistance was triggered by a driver initiated pass request. At step 140, control determines if the road center line is a non-passing lane marker indicating the vehicle 10 is in a no passing zone (similar to step 110). If yes, at step 142, control identifies a distance to the next available passing zone (e.g., via navigation system 32) and provides a notification to the driver indicating a distance to the next passing zone (e.g., via user interface 36). Control then returns to step 140. If the center line indicates a passing zone, control proceeds to step 144.

At step 144, control determines a passing area or zone for vehicle 10 and scans for connected vehicles within the zone (similar to step 116). At step 146, control attempts to connect to the vehicles within the zone (similar to step 118). At step 148, control determines if requirements or conditions are met to successfully execute the passing maneuver around the front vehicle. Example conditions include: (i) enough distance from oncoming traffic to execute a pass for given speed, (ii) enough space in front of the vehicle being passed for a merge, (iii) enough distance from a non-passing zone to execute a pass, (iv) no reported objects/stopped traffic ahead, (v) other passing maneuvers are not occurring in the area that could interfere, (vi) speed limits are not exceeded, etc.

If the passing conditions are not met, control proceeds to step 150 and control provides a notification to the driver indicating the oncoming traffic lane and/or the travel lane are not clear ahead of the vehicle to be passed. Control then returns to 148. However, if the passing conditions are met, control proceeds to step 152 and the data from the connected vehicles is computed, for example at the edge computing center 20, and available passing information and time/distance left to complete the passing maneuver are displayed to the driver (e.g., via HMI on user interface 36).

At step 154, control begins a start timer setting a predetermined time for the vehicle 10 to begin the passing maneuver (e.g., crossing over the center line). At step 156, control determines if the start timer has expired. If yes, control proceeds to step 158 and disconnects from the connected vehicles 18 before ending or timing out at step 160. If the start timer has not expired, control proceeds to step 162 and determines if the vehicle 10 has crossed the center line (e.g., via sensors 44). If no, control returns to step 156. If the vehicle 10 has crossed the center line, control then proceeds to step 124 (FIG. 3A) to complete the passing maneuver.

Described are systems and methods to assist a driver to execute a passing maneuver through an oncoming traffic lane of a non-divided roadway. The vehicle utilizes various sensor systems to identify the non-divided roadway and whether or not the vehicle is in a passing zone, as indicated by center line markings. When initiating the passing maneuver, the passing vehicle connects to surrounding/oncoming vehicles and collects data therefrom. The data is analyzed, for example on an edge computing platform, and information is provided to the driver to assist in the passing maneuver. Example information includes front camera views from the vehicle to be passed, as well as time and distance to safely execute the passing maneuver.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A vehicle passing assistance system to assist a vehicle in executing a passing maneuver through an oncoming traffic lane, the system comprising:

a wireless communications system configured to connect with one or more surrounding vehicles;

a user interface configured to provide information about the passing maneuver;

one or more sensors configured to measure operating parameters of the vehicle during the passing maneuver; and a controller, having a processor and a memory, in signal communication with the wireless communications system, the user interface, and the one or more sensors, wherein during the passing maneuver the controller is programmed to:

detect, by the one or more sensors, the vehicle is traveling on a non-divided roadway where the passing maneuver will occur through the oncoming traffic lane;

detect, by the one or more sensors, initiation of the passing maneuver;

scan for and connect, by the wireless communications system, to surrounding vehicles;

receive, by the wireless communications system, data from the connected vehicles, wherein the connected vehicles includes at least a preceding vehicle to be passed during the passing maneuver;

display, on the user interface, information to a driver of the vehicle, based on the received data and measured operating parameters, regarding the initiated passing maneuver; and display, on the user interface, a front camera view of the preceding vehicle, based on the received data from the connected vehicles.

2. The vehicle passing assistance system of claim 1, wherein the controller detects the initiation of the passing maneuver by detecting, via the one or more sensors, the vehicle has crossed over a center line into the oncoming traffic lane.

3. The vehicle passing assistance system of claim 1, wherein the controller detects the initiation of the passing maneuver by receiving a driver initiated pass request via the user interface.

4. The vehicle passing assistance system of claim 1, wherein the controller is further programmed to determine, based on the received data, if enough space is available in front of the preceding vehicle for the vehicle to execute the passing maneuver.

5. The vehicle passing assistance system of claim 1, wherein the controller is further programmed to connect to an edge computing center via the wireless communications system, and wherein the edge computing center receives and processes data from the connected surrounding vehicles.

6. The vehicle passing assistance system of claim 1, wherein the connected vehicles include an oncoming vehicle traveling in the oncoming traffic lane.

7. The vehicle passing assistance system of claim 6, wherein the controller is further programmed to determine if there is enough time and distance for the vehicle to execute the passing maneuver based on a speed of the oncoming vehicle, a speed of the passing vehicle, and a distance therebetween.

8. The vehicle passing assistance system of claim 1, wherein the controller is further programmed to send a notification to the connected surrounding vehicles indicating the passing maneuver is in progress.

9. The vehicle passing assistance system of claim 1, wherein the controller is further programmed to determine if the vehicle is currently in a passing zone or a no passing zone of the non-divided roadway.

10. The vehicle passing assistance system of claim 1, wherein the displayed information is a remaining time and a remaining distance for the vehicle to complete the passing maneuver based on the received data from the connected vehicles.

11. The vehicle passing assistance system of claim 1, wherein the one or more sensors include one or more cameras, one or more ultrasonic sensors, and at least one of a RADAR or LIDAR.

12. A method of operating a vehicle passing assistance system to assist a vehicle in executing a passing maneuver through an oncoming traffic lane, the method comprising:

detecting, by a controller having a processor and a memory, and one or more sensors, the vehicle is traveling on a non-divided roadway where the passing maneuver will occur through the oncoming traffic lane;

detecting, by the controller, initiation of the passing maneuver;

scanning for and connecting to surrounding vehicles via the controller and a wireless communication system, wherein the connected vehicles include a preceding vehicle to be passed during the passing maneuver;

receiving, at the controller, data from the connected vehicles; and displaying, by the controller and on a user interface, information to a driver of the vehicle regarding the initiated passing maneuver, based on the received data and measured operating parameters from the one or more sensors; and displaying, by the controller and on the user interface, a front camera view of the preceding vehicle.

13. The method of claim 12, wherein detecting initiation of the passing maneuver comprises:

detecting, by the controller and the one or more sensors, the vehicle has crossed over a center line into the oncoming traffic lane; and detecting, by the controller, a driver initiated pass request via the user interface.

14. The method of claim 12, wherein the connected vehicles further includes an oncoming vehicle traveling in the oncoming traffic lane.

15. The method of claim 14, further comprising:

determining, by the controller and the received data, if enough space is available in front of the preceding vehicle for the vehicle to execute the passing maneuver; and determining, by the controller and the received data, if there is enough time and distance for the vehicle to execute the passing maneuver based on a speed and location of the oncoming vehicle.

16. The method of claim 12, further comprising sending, by the controller and the wireless communications system, a notification to the connected surrounding vehicles indicating the passing maneuver is in progress.

17. The method of claim 12, further comprising determining, by the controller and a navigation system, if the vehicle is currently in a passing zone or a no passing zone of the non-divided roadway.

18. The method of claim 12, wherein said displaying information includes displaying a remaining time and a remaining distance for the vehicle to complete the passing maneuver based on the received data from the connected vehicles.

* * * * *